Sept. 22, 1925.
A. A. CONWAY
1,554,953
FRICTION CLUTCH
Filed April 8, 1924
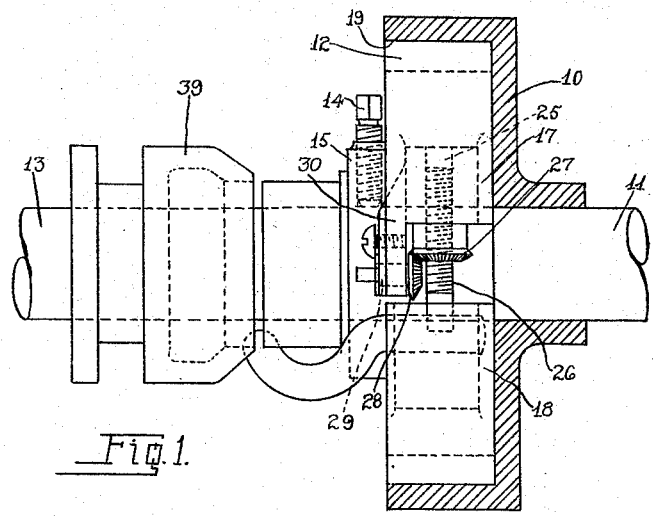
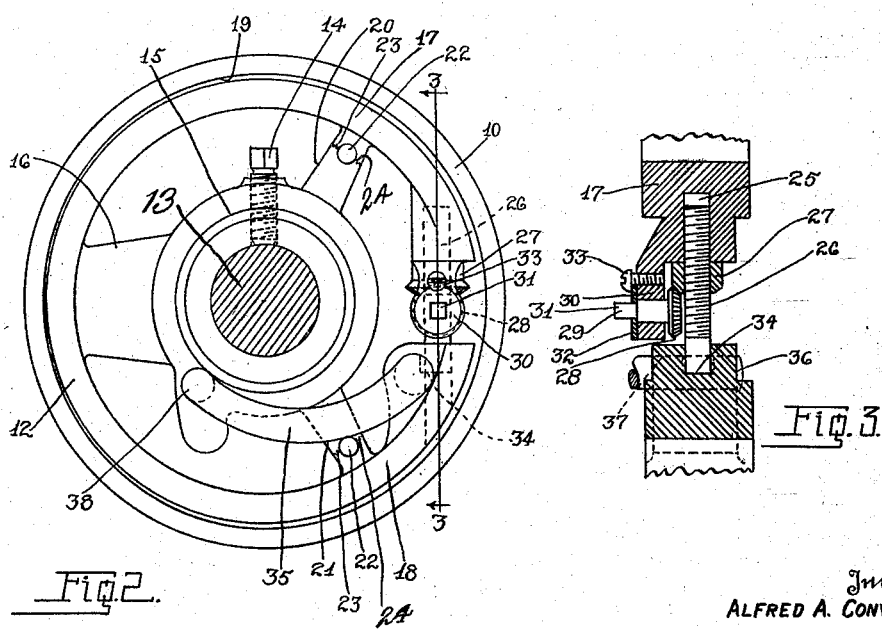
Inventor
ALFRED A. CONWAY,
By Murray & Zugelter
Attorneys Patented Sept. 22, 1925.

1,554,953

UNITED STATES PATENT OFFICE.

ALFRED A. CONWAY, OF CINCINNATI, OHIO.

FRICTION CLUTCH.

Application filed April 8, 1924. Serial No. 705,095.

*To all whom it may concern:*

Be it known that I, ALFRED A. CONWAY, a citizen of the United States of America, and a resident of Cincinnati, in the county of Hamilton and State of Ohio, have invented a new and useful Improvement in a Friction Clutch, of which the following is a specification.

An object of my invention is to provide a clutch having a simple and efficient means for adjusting the shoe thereof.

Another object of my invention is to provide a clutch wherein a full contact between the shoe and the shoe housing is attained.

These and other objects are attained by the means described herein and disclosed in the accompanying drawings, in which, Fig. 1 is a side elevation of a clutch embodying my invention, one clutch member being shown in section.

Fig. 2 is an elevational view, at right angles to Fig. 1.

Fig. 3 is an enlarged fragmental sectional view on line 3—3 of Fig. 2.

The device of my invention comprises a housing 10 that may be fixedly mounted on a shaft 11, and is adapted to receive the friction or clutch shoe 12 fixedly mounted on the shaft 13. The friction or clutch shoe may be mounted on the shaft 13 by any suitable means, such as the set screw 14 extending through the hub 15 of the shoe, and engaging the shaft 13. The hub is provided with a rear arm 16 of fairly substantial proportion that carries the ends 17 and 18 of the expansible band of the shoe. The ends 17 and 18 may move to an eccentric and a concentric relationship to the internal face 19 of the housing 10. The ends 17 and 18 are supported from the hub 15, by arms 20 and 21, at the time that the shoe is cast, and subsequent thereto, the arms are drilled for providing bores 22 therein, and the arms are then broken, the lines of fracture being indicated at 23 and 24. This structure permits springing or relative flexing of the forward or free ends of the shoe relative to the retaining arm 16. The end 17 of the shoe is provided with a recess or bore 25 adapted to receive one end of a screw 26. The screw carries a bevel gear 27 that engages a bevel gear 28 mounted on a stud shaft 29 extending through a bore provided in the extension 30 on the end 17 of the friction or clutch shoe. The end 31 of the stud shaft 29 is of an angular cross section, for example as shown herein, square, and receives a washer 32 having an angular aperture therethrough, the said aperture being complementary to the end 31 of the shaft 29. A screw 33 is carried by the extension 30 and may engage the washer 32 for locking the washer against movement. From the foregoing, it will be evident that by releasing the washer 32 from the binding influence of the screw 33 and by applying a small wrench or the like to the angular end or head of the shaft 29, said shaft may be removed for adjusting the screw 26 in the bore 25. The end of the screw 26 extending from the bore 25 engages a seat 34 formed on the lever 35 carried by the friction or clutch shoe. The lever 35 comprises an end 36 extending in parallelism with the axis of the shaft 13, and disposed within a bore 37 provided at the end 18 of the friction or clutch shoe. A second end 38 of the lever is disposed adjacent the hub 15, and is adapted to be engaged by a cone 39 movable longitudinally of the shaft 13. The movement of the cone 39 and the engagement of said cone upon the lever 35 is utilized for oscillating the lever 36 in the bore 37 whereby to reciprocate the screw 26 with the consequent expanding and contracting of the friction or clutch shoe for effecting clamping and releasing of the friction or clutch shoe upon the casing or housing 10.

Attention is called to the fact that the parts when in released position, are so related that the distance from the axis about which the friction or clutch shoe revolves, to the outer surface of the shoe disposed adjacent the arm 16, is greater than the distance from the said axis to the outer points of the ends 17 and 18 of the shoe. In other words the outer surface of the shoe is eccentric to the axis, see Fig. 2. When the friction or clutch shoe is expanded, the ends 17 and 18 are moved outwardly, and assume a concentric relationship to the axis about which the shoe revolves, consequently, it is possible to attain a full or complete peripheral contact of the shoe upon the housing.

In practice the friction or clutch shoe is first machined true or concentric with its axis. Then it is machined to make the outer surface thereof eccentric to its axis, the greater portion of the cut being made at the ends of the shoe. Thereafter the arms are drilled and fractured. The result is a shoe that is under no strain when in a contracted position, and which on expansion provides positive full peripheral contact upon the housing 10.

What I claim is:

1. In a device of the class described, the combination of a clutch housing, a clutch shoe for external engagement upon an internal face provided on the housing, expansible arms carried by the shoe, for engaging said face on the housing, one of the expansible arms being provided with a bore, a screw extending reciprocally into the bore, a gear threaded on the screw, a second gear engaging the first gear, and provided with means whereby the gears may be revolubly actuated, a lever carried by the second expansible end of the shoe, and engaged by the screw, and means for actuating the lever for expanding and contracting the ends of the shoe.

2. In a device of the class described, the combination of a clutch housing, a clutch shoe for external engagement upon an internal face provided on the housing, expansible arms carried by the shoe, for engaging said face on the housing, one of the expansible arms being provided with a bore, a screw extending reciprocally into the bore, a gear threaded on the screw, a second gear engaging the first gear, and provided with means whereby the gears may be revolubly actuated, a lever carried by the second expansible end of the shoe, and engaged by the screw, means for actuating the lever for expanding and contracting the ends of the shoe, and means for locking the gears against movement.

3. In a device of the class described, the combination of a shoe comprising a pair of expansible arms, one of said arms being provided with a bore, a screw received in said bore and extending therefrom, a gear provided with a threaded bore through which the screw may be moved by rotation of the gear, the arm provided with said bore being also provided with an extension having a bore therein, a shaft extending revolubly through the bore and provided with an angular head, a gear carried by the said shaft and engaging the first mentioned gear, a washer provided with an angular bore, said bore being complementary to the head of the shaft and adapted to receive the head of the shaft, a screw carried by the extension adapted to engage the washer and to lock the washer, a lever carried by the second arm of the shoe, and engaging the screw, and means for actuating the lever for moving the screw whereby to expand and contract the clutch shoe.

4. In a device of the class described the combination of a clutch housing, a friction shoe for engaging the housing and comprising a pair of arms, a gear on one arm, a screw movable relative to the gear, a lever associated with the other arm engaging the screw for expanding and contracting the arms, and a second gear engaging the first gear for effecting relative movement of the screw and the first gear.

5. In a device of the class described the combination with an expansion shoe comprising arms, of a reciprocating member, a pair of meshing gears on one arm for adjusting the reciprocating member on said one arm, and means carried by the other arm engaging the reciprocating member for reciprocating said member.

6. In a device of the class described the combination with an expansion shoe comprising arms, of a reciprocating member, a pair of meshing gears on one arm for adjusting the reciprocating member on said one arm, means carried by the other arm engaging the reciprocating member for reciprocating said member, and means for locking the gears against relative movement.

In testimony whereof, I have hereunto subscribed my name this 4th day of April, 1924.

ALFRED A. CONWAY.